(12) United States Patent
Kwak

(10) Patent No.: US 8,771,865 B2
(45) Date of Patent: Jul. 8, 2014

(54) SECONDARY BATTERY

(75) Inventor: Yoontai Kwak, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 575 days.

(21) Appl. No.: 12/805,439

(22) Filed: Jul. 30, 2010

(65) Prior Publication Data

US 2011/0045340 A1 Feb. 24, 2011

(30) Foreign Application Priority Data

Aug. 20, 2009 (KR) ........................ 10-2009-0077179

(51) Int. Cl.
*H01M 2/02* (2006.01)

(52) U.S. Cl.
USPC ............. 429/163; 429/164; 429/94; 429/176

(58) Field of Classification Search
USPC .................................. 429/163, 164, 94, 176
See application file for complete search history.

(56) References Cited

U.S. PATENT DOCUMENTS

| 4,237,202 | A  | * | 12/1980 | Karpal ........................ | 429/120 |
| 4,732,826 | A  | * | 3/1988 | Hardigg ...................... | 429/176 |
| 6,174,620 | B1 | * | 1/2001 | Okada et al. ................ | 429/176 |
| 6,489,054 | B2 | * | 12/2002 | Cheiky et al. ............... | 429/185 |
| 6,638,382 | B2 | * | 10/2003 | Satou ............................ | 156/64 |
| 7,326,489 | B2 | * | 2/2008 | Jones et al. .................. | 429/53 |
| 8,252,455 | B2 | * | 8/2012 | Kusama et al. ............. | 429/164 |
| 2004/0185337 | A1 |   | 9/2004 | Ishizaki | |
| 2004/0258987 | A1 | * | 12/2004 | Shin .............................. | 429/163 |
| 2005/0196669 | A1 | * | 9/2005 | Lee et al. ..................... | 429/163 |
| 2008/0050649 | A1 | * | 2/2008 | Goldstein et al. ............. | 429/176 |
| 2009/0136831 | A1 | * | 5/2009 | Wyser ............................ | 429/94 |
| 2009/0311594 | A1 | * | 12/2009 | Uh ................................. | 429/164 |
| 2010/0068616 | A1 | * | 3/2010 | Uh ................................. | 429/163 |
| 2010/0233530 | A1 | * | 9/2010 | Mao et al. ..................... | 429/185 |
| 2010/0266878 | A1 | * | 10/2010 | Eilertsen ........................ | 429/53 |
| 2010/0330415 | A1 | * | 12/2010 | Park .............................. | 429/178 |
| 2011/0045340 | A1 | * | 2/2011 | Kwak ........................... | 429/163 |
| 2011/0123854 | A1 | * | 5/2011 | Kim .............................. | 429/176 |
| 2011/0223461 | A1 | * | 9/2011 | Kim .............................. | 429/120 |
| 2012/0028108 | A1 | * | 2/2012 | Inagaki et al. ................ | 429/163 |
| 2012/0034511 | A1 | * | 2/2012 | Kitamura ...................... | 429/163 |
| 2012/0135294 | A1 | * | 5/2012 | Harada et al. ................ | 429/156 |
| 2012/0171550 | A1 | * | 7/2012 | Inagaki et al. ................ | 429/158 |
| 2012/0214036 | A1 | * | 8/2012 | Kim .............................. | 429/94 |
| 2012/0258352 | A1 | * | 10/2012 | Hong ............................ | 429/163 |
| 2014/0030570 | A1 | * | 1/2014 | Imanishi et al. .............. | 429/100 |

FOREIGN PATENT DOCUMENTS

KR 10 2004-0071608 A 8/2004
KR 10 2007-0097852 A 10/2007

* cited by examiner

*Primary Examiner* — Joseph S Del Sole
*Assistant Examiner* — Nahida Sultana
(74) *Attorney, Agent, or Firm* — Lee & Morse, P.C.

(57) ABSTRACT

A secondary battery including an electrode assembly, and a case, the case including a pair of long side walls facing each other, and a pair of short side walls at ends of the long side walls, and accommodating the electrode assembly in a space defined by the long side walls and the short side walls, each short side wall including a bottom region and a top region, the bottom region and top region each having a thickness, and the thickness of the bottom region being greater than the thickness of the top region.

14 Claims, 3 Drawing Sheets

SECONDARY BATTERY

BACKGROUND

1. Field

Embodiments relate to a secondary battery.

2. Description of the Related Art

In general, a secondary battery may be discharged and recharged, unlike a primary battery, which may not be recharged. Among secondary batteries, small secondary batteries may be used for high-technology electronic apparatuses, e.g., mobile telephones, laptop computers, and camcorders. Large secondary batteries may be used for, e.g., driving motors of electric or hybrid vehicles. Because it is desirable for the capacity of the secondary battery to increase while a volume of the secondary battery is limited, development of secondary batteries having high capacity and small volume is desirable.

SUMMARY

Embodiments are directed to a secondary battery, which represents advances over the related art.

It is a feature of an embodiment to provide a secondary battery having a larger internal space to thereby increase an amount of electrolyte and capacity of the secondary battery.

At least one of the above and other features and advantages may be realized by providing a secondary battery including an electrode assembly, and a case, the case including a pair of long side walls facing each other, and a pair of short side walls at ends of the long side walls, and accommodating the electrode assembly in a space defined by the long side walls and the short side walls, each short side wall including a bottom region and a top region, the bottom region and top region each having a thickness, and the thickness of the bottom region being greater than the thickness of the top region.

The bottom region may have a thickness equal to a thickness of the long side walls.

The case may include a step disposed at a boundary between the bottom region and the top region.

The top region may have a uniform thickness from positions where the top region joins the long side walls toward a center of the corresponding short side wall.

Each short side wall may have a planar shape.

The top region may have a thickness of about 1.5 mm to about 2.5 mm.

A height of the top region may be shorter than a height of the bottom region.

Each short side wall may have a curved shape.

The thickness of the top region may be gradually reduced from positions where the top region joins the long side walls towards a center of the corresponding short side wall.

The top region may have an external surface having a curvature and an internal surface having a curvature, the curvature of the external surface being greater than the curvature of the internal surface.

The top region may have an external surface having a curvature and an internal surface having a curvature, the curvature of the external surface being equal to the curvature of the internal surface.

The equal curvatures of the internal and external surfaces of the top region may form a stop at a position where the top region joins the long side walls and bottom region due to differences in thicknesses thereof.

The secondary battery may further include a cap plate coupled to the long side walls and the top regions to seal the case.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
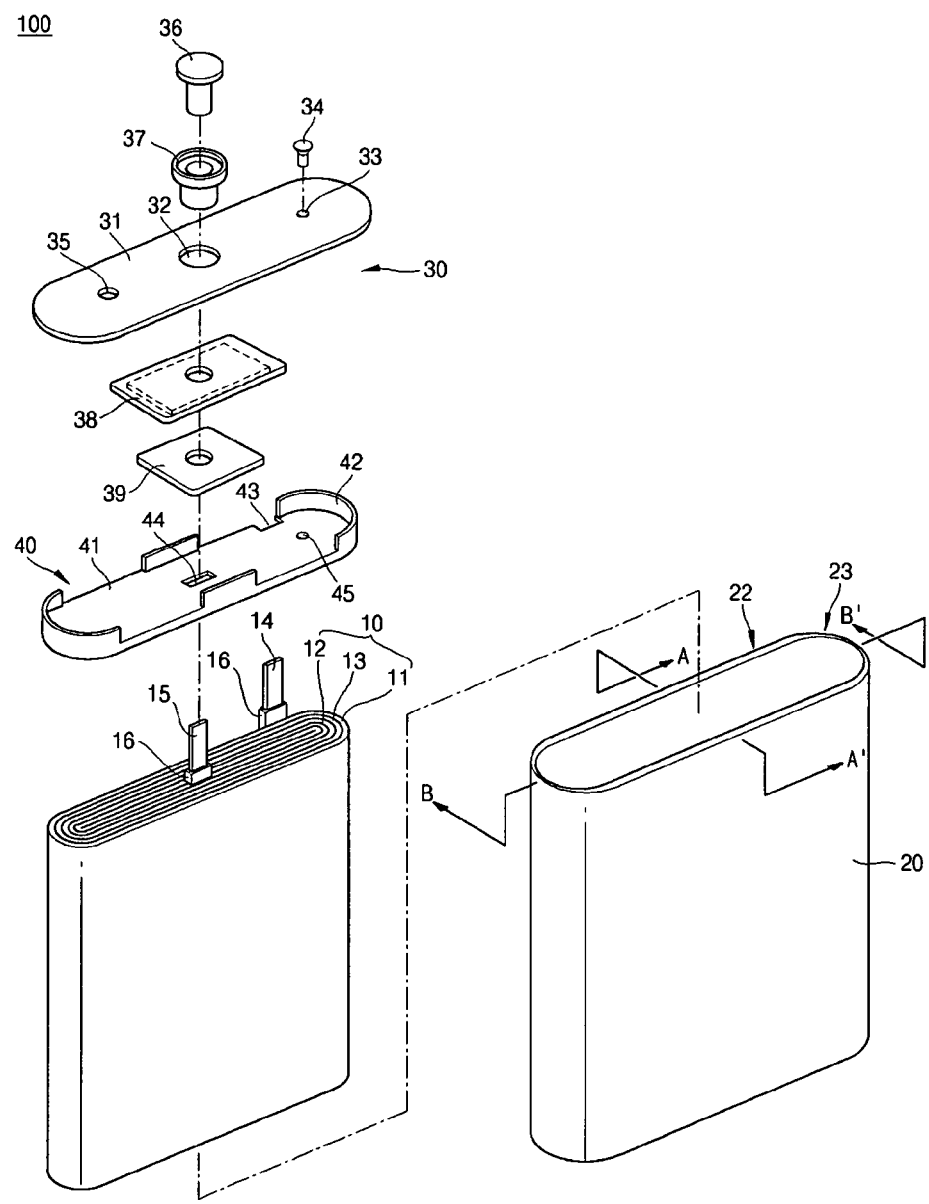
FIG. 1 illustrates an exploded perspective view of a secondary battery according to an embodiment.

Korean Patent Application No. 10-2009-0077179, filed on Aug. 20, 2009, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of elements and regions may be exaggerated for clarity of illustration. It will also be understood that when an element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Figure 2:
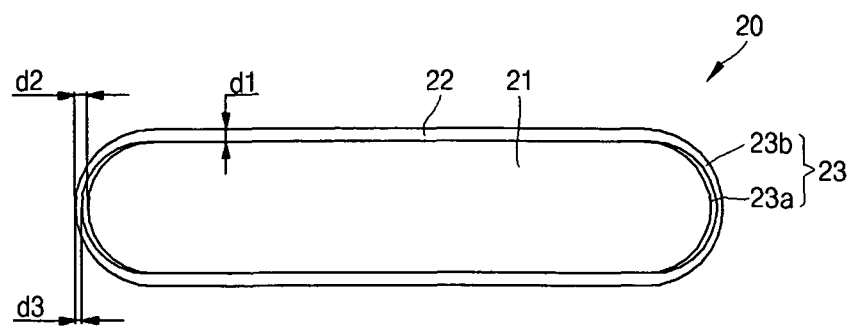
FIG. 2 illustrates a plan view of a case of the secondary battery of FIG. 1.
Figure 3:
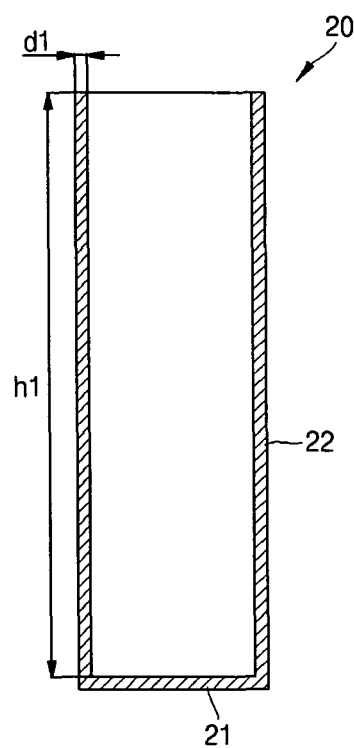
FIG. 3 illustrates a sectional view taken along the line A-A' of FIG. 1.
Figure 4:
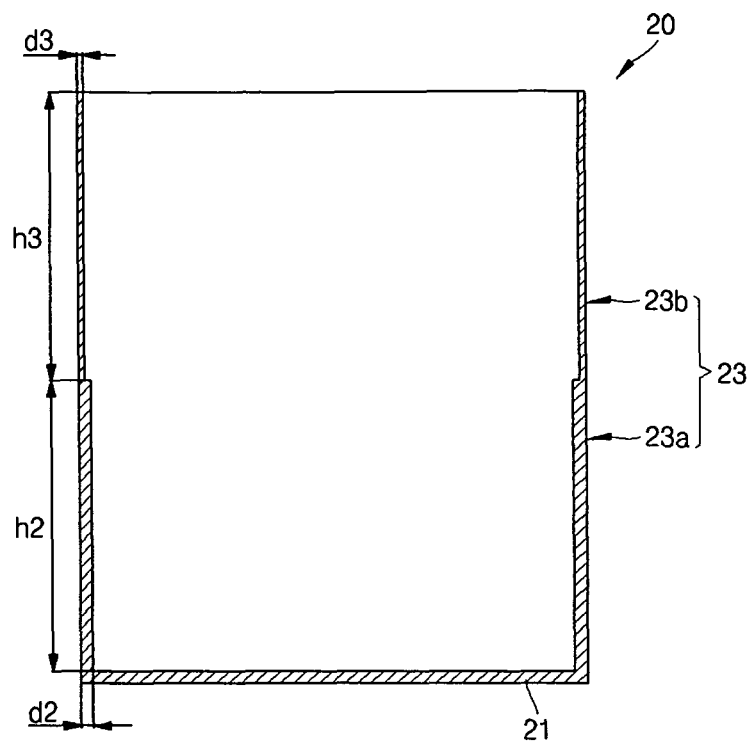
FIG. 4 illustrates a sectional view taken along the line B-B' of FIG. 1.

FIG. 1 illustrates an exploded perspective view of a secondary battery according to an embodiment. FIG. 2 illustrates a plan view of a case of the secondary battery of FIG. 1. FIG. 3 illustrates a sectional view taken along the line A-A' of FIG. 1. FIG. 4 illustrates a sectional view taken along the line B-B' of FIG. 1. Referring to FIGS. 1 to 4, a secondary battery 100 according to an embodiment may include an electrode assembly 10, a case 20 for accommodating the electrode assembly 10, a cap assembly 30 for sealing a top opening of the case 20, and an insulation case 40 interposed between the electrode assembly 10 and the cap assembly 30.

The electrode assembly 10 may be formed by winding or overlapping thin plate- or film-shaped first and second electrode plates 11 and 12 and a separator 13 insulating the first electrode plate 11 from the second electrode plate 12. The electrode assembly 10 may further include a first electrode tab 14 and a second electrode tab 15.

The first electrode plate 11 may include a first electrode collector made of, e.g., aluminum foil, and a first electrode active material formed in the first electrode collector. The first electrode active material may include, e.g., cobalt acid lithium.

The second electrode plate 12 may include a second electrode collector made of, e.g., copper foil, and a second electrode active material formed in the second electrode collector. The second electrode active material may include, e.g., carbon.

A polarity of the first electrode plate 11 may be different from a polarity of the second electrode plate 12. In an implementation, the first electrode plate 11 may serve as a positive electrode and the second electrode plate 12 may serve as a negative electrode.

The separator 13 may be made of, e.g., polyethylene, polypropylene, and/or a co-polymer of polyethylene and polypropylene. The separator 13 may have a width wider than a width of the first electrode plate 11 and a width of the second electrode plate 12, in order to, e.g., prevent a short circuit between the first and second electrode plates 11 and 12.

The first electrode tab 14 and the second electrode tab 15 may protrude from the first electrode plate 11 and the second electrode plate 12, respectively. An insulation tape 16 may be wound around the first electrode tab 14 and the second electrode tab 15 in order to, e.g., prevent a short circuit between the first and second electrode plates 11 and 12 at a boundary from which the first and second electrode tabs 14 and 15 protrude outside of the electrode assembly 10.

The case 20 may be a metal can formed by, e.g., deep drawing. The case 20 may be made of a light conductive metal, e.g., aluminum or an aluminum alloy, and may serve as an electrode. The case 20 may serve as the container of the electrode assembly 10 and an electrolyte. The case 20 may have an open top into which the electrode assembly 10 may be inserted. The open top of the case 20 may be sealed by the cap assembly 30.

The case 20 may include a bottom surface 21, a pair of long side walls 22 perpendicular to the bottom surface 21, and a pair of short side walls 23 connecting ends of the long side walls 22 to each other. The bottom surface 21, the long side walls 22 and the short side walls 23 may define an internal space therebetween. The electrode assembly 10 and the electrolyte may be accommodated in the internal space.

The bottom surface 21 may generally have a planar plate shape. The bottom surface 21 may include a pair of long sides longitudinally formed in one direction and a pair of short sides connecting the long sides to each other.

The long side walls 22 may face each other and may be perpendicular to the bottom surface 21. The long side walls 22 may be formed perpendicularly to the bottom surface 21 along the long sides thereof, that is, in the longitudinal direction of the bottom surface 21. In an implementation, the long side walls 22 may have a width d1 of, e.g., about 0.3 mm, and a uniform height h1.

The short side walls 23 may face each other and may be perpendicular to the bottom surface 21. The short side walls 23 may be formed perpendicularly to the bottom surface 21 along the short sides thereof. The short side walls 23 may connect the ends of the long side walls 22 to each other. In the FIGS., it is illustrated that the short side walls 23 are curved to correspond to the shape of the electrode assembly 10. However, in an implementation, the short side walls 23 may have a plane shape perpendicular to the long side walls 22 according to a desired design.

The short side walls 23 may include bottom regions 23a contacting the bottom surface 21 and top regions 23b disposed on top of the bottom regions 23a. In other words, each short side wall 23 may include a bottom region 23a and a top region 23b disposed on the bottom region 23a. The bottom regions may have a height h2 and the top regions 23b may have a height h3. A sum of the height h2 of the bottom regions 23a and the height h3 of the top regions 23b may be equal to the height h1 of the long side walls 22. The bottom regions 23a may be lower than the top regions 23b.

The bottom regions 23a may be perpendicular to the bottom surface 21. A thickness d2 of the bottom regions 23a may be equal to the width d1 of the long side walls 22. The bottom regions 23a may connect the ends of the long side walls 22 to each other.

The top regions 23b may extend from the bottom regions 23a. A thickness d3 of each top region 23b may be less than the thickness d2 of each bottom region 23a. Insides of the case 20 may be etched to form top regions 23b having smaller thicknesses than the bottom regions 23a. Curvatures of external surfaces of the top regions 23b may be greater than curvatures of internal surfaces of the top regions 23b. In other words, portions of the case 20 where each top region 23b joins or contacts the long side walls 22 may have the same thickness as the thickness of the long side walls 22. The thickness of each top region 23b may be reduced gradually towards centers of the corresponding short side wall 23. The thickness d3 of each top regions 23b may be defined as the narrowest width of the center of the corresponding short side wall 23. Steps may be formed at boundaries between the bottom regions 23a and the top regions 23b due to differences in thicknesses of the top and bottom regions 23b and 23a. Due to such a configuration, the case 20 of an embodiment may have an internal space greater than that of a secondary battery where the case has a uniform thickness. As a result, due to the configuration of the top regions 23b, the secondary battery 100 of an embodiment may accommodate more electrolyte than other secondary batteries and the capacity of the secondary battery may thereby be increased.

In the secondary battery 100 of an embodiment, the thickness d3 of the top regions 23b may be, e.g., about 1.5 mm to about 2.5 mm. Maintaining the thickness d3 of the top regions 23b at about 1.5 or greater may help ensure that the case 20 maintains stiffness sufficient to protect the secondary battery from explosion or impact and is easily welded to the cap assembly 30. Maintaining the thickness d3 of the top regions 23b at about 2.5 mm or less may help ensure that the capacity of the case 20 is increased.

A height h3 of the top regions 23b may be smaller than a height h2 of the bottom regions 23a. When the height h3 of the top regions 23b is smaller than the height h2 of the bottom regions 23a, the case 20 may secure sufficient stiffness, ensuring reliability of the secondary battery.

The cap assembly 30 may include a cap plate 31, an injection stopper 34, a safety vent 35, and an electrode terminal 36.

The cap plate 31 may be made of a metal plate having a size and shape corresponding to a size and shape of the top opening of the case 20. That is, the cap plate 31 may correspond to the top regions 23b of the short side walls 23 and the long side walls of the case 20. Therefore, the cap plate 31 may cover the top of the case 20 and may prevent the electrolyte from leaking. The cap plate 31 may be coupled to the case 20 by welding. This coupling may electrically connect the cap plate 31 to the case 20, the cap plate 31 thereby serving as the same electrode as the case 20, e.g., a positive electrode. A terminal through hole 32 may be formed in the center of the cap plate 31. An electrolyte injection hole 33 for injecting the electrolyte may be formed on one side of the cap plate 31.

The injection stopper 34 may seal the electrolyte injection hole 33 after the electrolyte is injected into the case 20 through the electrolyte injection hole 33. The injection stopper 34 may be made of, e.g., aluminum or an alloy or composition containing aluminum. The injection stopper 34 may be coupled to the electrolyte injection hole 33 by, e.g., mechanical press-fitting.

The safety vent 35 may be formed on another side of the cap plate 31. Since the safety vent 35 may be thinner than the other parts of the cap plate 31, the safety vent 35 may be the first part to break when an internal pressure of the case 20 increases. Therefore, the safety vent 35 may release an internal gas when the internal pressure of the case 20 increases due to, e.g., overcharge, so that the stability of the secondary battery may be guaranteed.

The electrode terminal 36 may penetrate the cap plate 31 through the terminal through hole 32. A tube shaped gasket 37 may be provided under the electrode terminal 36 to insulate the electrode terminal 36 from the cap plate 31. An insulation plate 38 may be provided on a bottom surface of the cap plate 31; and a terminal plate 39 may be provided on a bottom surface of the insulation plate 38. A bottom surface of the electrode terminal 36 may be electrically connected to the terminal plate 39. Accordingly, the electrode terminal 36 may be electrically connected to the second electrode plate 12 of the electrode assembly 10 through the second electrode tab 15 of the electrode assembly 10. The first electrode plate 11 of the electrode assembly 10 may be electrically connected to the cap plate 31 through the first electrode tab 14.

The insulation case 40 may be disposed between the electrode assembly 10 and the cap plate 30. The insulation case 40 may be inserted into the case 20 to be sealed by the cap plate 30. The insulation case 40 may be made of an insulating polymer resin, e.g., propylene.

The insulation case 40 may include a plate shaped main body 41, a support 42 perpendicularly extending from the main body 41 to support the main body 41 and to increase a contact force to the internal wall of the case 20, electrode tab outlets 43 and 44, through which the first electrode tab 14 and the second electrode tab 15 may protrude, and an electrolyte injection hole 45, through which the electrolyte may be injected.

As described above, in the secondary battery 100 according to an embodiment, the short side walls 23 of the case 20 may include the bottom regions 23a and the top regions 23b. The thickness d3 of the top regions 23b may be smaller than the thickness d2 of the bottom regions 23a, so that the internal volume of the case 20 may be increased. Therefore, the amount of the electrolyte and, in turn, the capacity of the secondary battery may be increased.

Hereinafter, a secondary battery according to another embodiment will be described.

Figure 5:
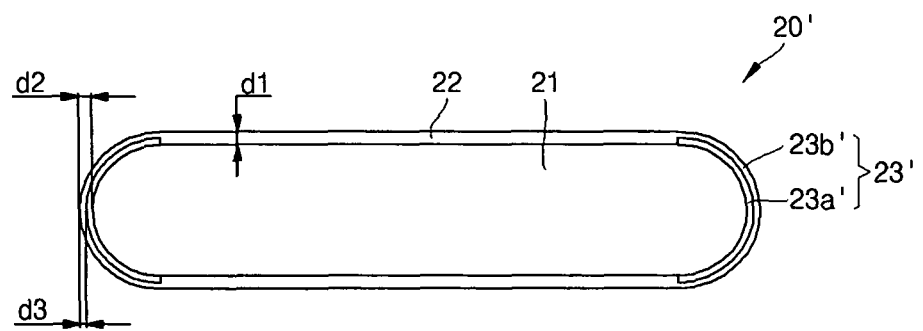
FIG. 5 illustrates a plan view of a case of a secondary battery according to another embodiment.

FIG. 5 illustrates a plan view of a case 20' of a secondary battery according to this further embodiment. Elements having the same structure and operation as the elements in the previous embodiment are denoted by the same reference numerals. Hereinafter, the description of the secondary battery according to this further embodiment will be in relation to differences from the previous embodiment.

As illustrated in FIG. 5, the case 20' of the secondary battery may include a bottom surface 21, long side walls 22, and short side walls 23'.

The short side walls 23' may include bottom regions 23a' perpendicular to the bottom surface 21 and top regions 23b' on the bottom regions 23a'.

The bottom regions 23a' may face each other and may be formed along the short sides of the bottom surface 21. A thickness d2 of the bottom regions 23a' may be equal to a thickness d1 of the long side walls 22.

The top regions 23b' may extend from tops of the bottom regions 23a'. A thickness d3 of the top regions 23b' may be smaller than the thickness d2 of the bottom regions 23a'. A curvature of external surfaces of the top regions 23b' may be equal to a curvature of internal surfaces of the top regions 23b'. That is, the top regions 23b' may have a uniform thickness d3 from portions thereof that contact the long side walls 22 toward centers of the short side walls 23'.

As a result, steps may be disposed where the top regions 23b' join or contact the long side walls 22 and the bottom regions 23a', due to differences in thicknesses thereof. The top regions 23b' may define a larger internal space of the case 20' than the top regions 23b in the previous embodiment. As a result, the case 20' including the top regions 23b' may accommodate a larger amount of electrolyte.

In the secondary battery according to the present embodiment, the overall thickness d3 of the top regions 23b' of the case 20' may be smaller than an overall thickness of the bottom regions 23a'. Thus, the internal space of the case 20' and the amount of the electrolyte and the capacity of the secondary battery may be increased.

Although not illustrated, the above-mentioned configurations may be applied to a secondary battery in which the short side walls have a planar shape. The above mentioned configuration may also be used in a large capacity battery for, e.g., an electric vehicle or a hybrid vehicle. Therefore, the internal space of the secondary battery may be increased.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
   an electrode assembly; and
   a case, the case:
   including a pair of long side walls facing each other, and a pair of short side walls at ends of the long side walls,
   including an open top into which the electrode assembly is inserted and including a bottom surface opposite to the open top, the bottom surface of the case being different from the long side walls and different from the short side walls, and
   accommodating the electrode assembly in a space defined by the bottom surface, the long side walls, and the short side walls,
   each short side wall including a bottom region and a top region, the bottom region and top region each having a thickness, and the thickness of the bottom region being greater than the thickness of the top region, wherein the top region is between the bottom region and the open top of the case and the bottom region is between the top region and the bottom surface of the case.

2. The secondary battery as claimed in claim 1, wherein the bottom region has a thickness equal to a thickness of the long side walls.

3. The secondary battery as claimed in claim 1, wherein the case includes a step disposed at a boundary between the bottom region and the top region.

4. The secondary battery as claimed in claim 3, wherein the top region has a uniform thickness from positions where the top region joins the long side walls toward a center of the corresponding short side wall.

5. The secondary battery as claimed in claim 4, wherein each short side wall has a planar shape.

6. The secondary battery as claimed in claim 1, wherein the top region has a thickness of about 1.5 mm to about 2.5 mm.

7. The second battery as claimed in claim 1, wherein a height of the top region is shorter than a height of the bottom region.

8. The secondary battery as claimed in claim 1, wherein each short side wall has a curved shape.

9. The secondary battery as claimed in claim 8, wherein the thickness of the top region is gradually reduced from positions where the top region joins the long side walls towards a center of the corresponding short side wall.

10. The secondary battery as claimed in claim 9, wherein the top region has an external surface having a curvature and an internal surface having a curvature, the curvature of the external surface being greater than the curvature of the internal surface.

11. The secondary battery as claimed in claim 8, wherein the top region has an external surface having a curvature and an internal surface having a curvature, the curvature of the external surface being equal to the curvature of the internal surface.

12. The secondary battery as claimed in claim 11, wherein the equal curvatures of the internal and external surfaces of the top region forms a step at a position where the top region joins the long side walls and bottom region due to differences in thicknesses thereof.

13. The secondary battery as claimed in claim 1, further comprising a cap plate coupled to the long side walls and the top regions to seal the case.

14. The secondary battery as claimed in claim 1, wherein the top region is directly on top of the bottom region in a vertical orientation.

* * * * *